US012759380B2

(12) United States Patent
Yildirim

(10) Patent No.: US 12,759,380 B2
(45) Date of Patent: Oct. 13, 2026

(54) METAL BAND

(71) Applicant: BFC FAHRZEUGTEILE GMBH, Bietigheim-Bissingen (DE)

(72) Inventor: Ali Yildirim, Waiblingen (DE)

(73) Assignee: BFC Fahrzeugteile GmbH, Bietigheim-Bissingen (DE)

( * ) Notice: Subject to any disclaimer, the term of this patent is extended or adjusted under 35 U.S.C. 154(b) by 0 days.

(21) Appl. No.: 17/629,846

(22) PCT Filed: Nov. 20, 2020

(86) PCT No.: PCT/EP2020/082830

§ 371 (c)(1),
(2) Date: Jan. 25, 2022

(87) PCT Pub. No.: WO2021/110428

PCT Pub. Date: Jun. 10, 2021

(65) Prior Publication Data

US 2022/0281393 A1 Sep. 8, 2022

(30) Foreign Application Priority Data

Dec. 3, 2019 (DE) ..................... 20 2019 106 738.1

(51) Int. Cl.
*B60J 10/18* (2016.01)
*B60J 10/70* (2016.01)

(52) U.S. Cl.
CPC ............... *B60J 10/18* (2016.02); *B60J 10/70* (2016.02); *Y10T 428/12361* (2015.01)

(58) Field of Classification Search
None
See application file for complete search history.

(56) References Cited

U.S. PATENT DOCUMENTS

| | | | | |
|---|---|---|---|---|
| 5,865,931 | A | 2/1999 | Serafin et al. | |
| 6,079,160 | A | 6/2000 | Bonds | |
| 6,488,790 | B1 * | 12/2002 | Hartmann | C22C 38/12 148/661 |
| 2005/0057004 | A1 | 3/2005 | Yamazaki et al. | |
| 2006/0121303 | A1 | 6/2006 | Neth | |

(Continued)

FOREIGN PATENT DOCUMENTS

| | | | |
|---|---|---|---|
| CN | 104696512 | A | 6/2015 |
| DE | 10033454 | A1 | 10/2001 |

(Continued)

OTHER PUBLICATIONS

Thyssenkrupp Steel Europe AG; Higher-Strengh and micro-alloyed steel (Höherfester Stahl-Mikrolegierter Stahl). (2018). Retrieved from https://www.thyssenkrupp-steel.com/en/products/sheet-coated-products/higher-strength-steel/higher-strength-steel.html; p. 1, 3 and English abstract thereof.

(Continued)

*Primary Examiner* — Xiaobei Wang
(74) *Attorney, Agent, or Firm* — Wiggin and Dana LLP

(57) ABSTRACT

A metal band as an inlay for trim strips or sealing strips or as edge protection, in particular for motor vehicles or switch cabinets, said metal band being provided with cut and/or punched apertures, wherein the metal band consists of microalloyed steel or multiphase steel.

20 Claims, 3 Drawing Sheets

(56) References Cited

U.S. PATENT DOCUMENTS

Figure 1:
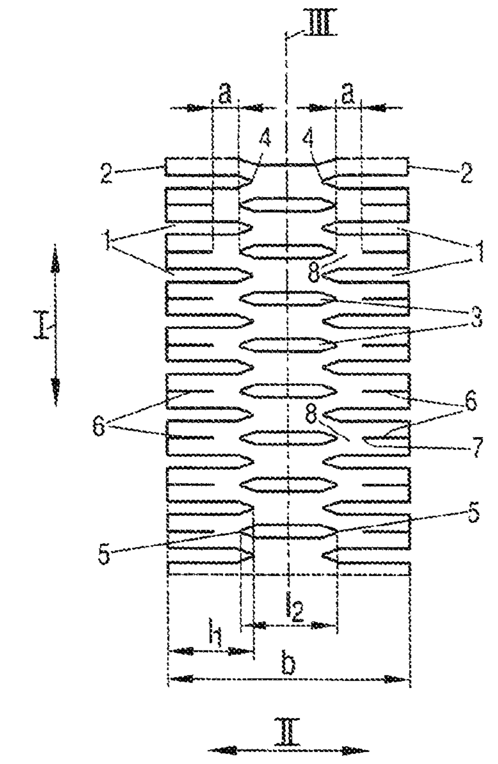

| | | | | |
|---|---|---|---|---|
| 2006/0185132 | A1* | 8/2006 | Wagner | B60J 10/18<br>24/289 |
| 2006/0220327 | A1 | 10/2006 | Russell | |
| 2010/0212230 | A1* | 8/2010 | Ogilvie | B60J 10/32<br>49/490.1 |
| 2011/0159311 | A1 | 6/2011 | Hotta et al. | |
| 2012/0018058 | A1 | 1/2012 | Antonissen et al. | |
| 2012/0152411 | A1 | 6/2012 | Morimoto et al. | |
| 2014/0072825 | A1 | 3/2014 | Tober | |
| 2014/0193657 | A1 | 7/2014 | Bonds | |
| 2018/0171858 | A1 | 6/2018 | Borisch et al. | |
| 2019/0136979 | A1 | 5/2019 | Gellrich et al. | |
| 2020/0263283 | A1* | 8/2020 | Schulz | C22C 38/02 |

FOREIGN PATENT DOCUMENTS

| | | | |
|---|---|---|---|
| DE | 10124484 | C1 | 11/2002 |
| DE | 102004035057 | A1 | 5/2005 |
| DE | 202005022004 | U1 | 3/2012 |
| DE | 102014103589 | A1 | 9/2014 |
| DE | 102017123236 | A1 | 4/2019 |
| EP | 0884209 | A1 | 12/1998 |
| EP | 1693237 | B1 | 9/2013 |
| EP | 3 118 343 | A1 | 1/2017 |
| EP | 2401462 | A1 | 6/2017 |
| JP | 2010143152 | A | 7/2010 |
| JP | 2011143918 | A | 7/2011 |
| WO | 2007086086 | A1 | 8/2007 |
| WO | 2010099391 | A1 | 9/2010 |
| WO | 2015/139996 | A1 | 9/2015 |

OTHER PUBLICATIONS

Hyssenkrupp Steel Europe AG; Overview of advanced high-strength steels (Mehrphasen-Stähle im Überblick). (2018). Retrieved from https://www.thyssenkrupp-steel.com/en/products/sheet-coated-products/multiphase-steel/; p. 1 and English abstract thereof.

"Materials Services Materials Processing Europe—Leistungsspectrum Catalog", thyssenkrupp, dated Jul. 2019.

German version EN 10268: Dec. 2013. Cold-rolled flat products made from steels with high yield strength for cold forming—Technical delivery conditions; pp. 1, 5-8 (page nos. correspond to original German-language document).

German version EN 10338: Oct. 2015. Hot-rolled and cold-rolled flat products without coating made from multiphase steels for cold forming—Technical delivery conditions; pp. 1, 5, 7-9, 11 (page nos. correspond to original German-language document).

Friedrich, H. E. (Ed.) Lightweight Construction in Automotive Engineering. 2nd edition. Wiesbaden, publisher: Springer Vieweg, 2017. pp. 207-208, 224-225, 232-238 (page nos. correspond to original German-language document)—ISBN 978-3-658-12294-2.

ASTM Standard A1008/A1008M (2018), "Standard Specification for Steel, Sheet, Cold-Rolled, Carbon, Structural, High-Strength Low-Alloy, High-Strength Low-Alloy with Improved Formability, Solution Hardened, and Bake Hardenable," ASTM International, West Conshohocken, PA, 2018, DOI: 10.1520/A1008_A1008M-18, www.astm.org.

BFC America, Product Datasheet No. A-1808, "BFC LS-310-6-CF Carrier," Mar. 4, 2003, US.

BFC America, Product Datasheet No. A-1824, "BFC LS-410-47-SD Carrier," Feb. 1, 2005, US.

BFC America, Product Datasheet No. A-1834, "BFC LS-381-47-SD Carrier," May 19, 2005, US.

BFC America, Product Datasheet No. A-1847, "Lanced Metal BFC 39.6 mm x 0.50 mm Single Diamond," May 18, 2006, US.

BFC America, Product Datasheet No. A-1849, "BFC LS-410-47-MSD Carrier," Apr. 27, 2006, US.

BFC America, Product Datasheet No. A-1890, "Lanced Metal BFC 42.0 x .5 Compress Fishbone Insert," Oct. 3, 2007, US.

BFC America, Product Datasheet No. A-1911, "Lanced Metal BFC Compressible Fishbone Insert 31mm x .5mm," Oct. 14, 2009, US.

BFC America, Product Datasheet No. A-1917, "BFC LS-410-47-ECO Carrier," Feb. 8, 2011, US.

BFC America, Product Datasheet No. A-1927, "BFC LS-450-47-OECO Carrier," Feb. 8, 2012, US.

BFC America, Product Datasheet No. A-1930, "BFC LS-310-5-OCF Carrier," Apr. 4, 2012, US.

BFC America, Product Datasheet No. A-1935, "BFC LS-416-47-OECO Carrier," Aug. 27, 2012, US.

BFC America, Product Datasheet No. A-1938 "Lanced Metal BFC 41.6 x .5 Compress Fishbone," Dec 18, 2012, US.

BFC America, Product Datasheet No. A-1958, "Lanced Metal BFC 43.0mm x 0.8mm Single Diamond Carrier, Aluminum," Mar. 3, 2015, US.

BFC America, Product Datasheet No. A-1980, "BFC LS-365-5-ECO-HSLA Carrier," Jan. 11, 2017, US.

BFC America, Product Datasheet No. A-1986, "BFC LS-360-47-MSD," Aug. 28, 2017, US.

BFC America, Product Datasheet No. A-1991 "BFC LS-435-5-OECO Offset HSLA Carrier," Sep. 7, 2017, US.

BFC America, Product Datasheet No. A-1992 "BFC LS-361-7-OECO-HXX," Oct. 4, 2017, US.

BFC America, Product Datasheet No. A-1993 "BFC LS-440-7-ECO-H24 Carrier," Oct. 12, 2017, US.

BFC America, Product Datasheet No. A-2004 "BFC LS-452-5-TECO Aluminum 1.5 mm Gap Carrier," Nov. 15, 2018, US.

BFC America, Product Datasheet No. A-2005 "BFC LS-411-5 Eco Aluminum Carrier," Nov. 15, 2018, US.

BFC America, Product Datasheet No. A-1933 "BFC LS-365-5-TECO Hsla," Jun. 6, 2012, US.

BFC America, Product Datasheet No. A-1941 "BFC LS-450-5-CF Carrier," Jan. 18, 2013, US.

BFC Fahrzeugteile Gmbh, Invoice No. 097246, "LS-365-5-TECO HSLA," Aug. 1, 2013, Germany.

BFC Fahrzeugteile Gmbh, Invoice No. 097226, Invoice for various HSLA products, Sep. 9, 2013, Germany.

BFC Fahrzeugteile Gmbh, Invoice No. 097271, "LS-450-5-CF HSLA," Oct. 20, 2013, Germany.

* cited by examiner

METAL BAND

The present invention relates to a metal band as an inlay for trim strips or sealing strips or as edge protection, in particular for motor vehicles or switch cabinets, said metal band being provided with cut and/or punched apertures.

Such metal bands are in particular used in the automotive sector as inlays for sealing strips for sealing engine compartment openings, trunk openings, and door openings. The continuously produced metal bands are jacketed by rubber and/or a flexible plastic and have slots in order, among other things, to enable a penetration of the sealing material in the case of metal bands not coated with an adhesive means since the adhesion between the rubber and the metal or between the plastic and the metal is not possible. On the other hand, metal bands coated with an adhesive means are very expensive. In addition to slots, which can in particular be produced by rotary cutting, such metal bands can also have punched apertures. Cut or punched slots can be widened by roller stretching.

Before or after the jacketing with the sealing material, metal bands of said kind are bent into a clamping profile that is usually of U shape and that is clamped onto the sealing flanges of the opening. In order in this respect to be able to follow the contours of the opening, the clamping profile usually has to be flexible both in the horizontal plane and in the vertical plane. In addition, the clamping profile should be compressible and/or stretchable in the longitudinal direction since the openings to be sealed can have considerable peripheral tolerances and a cutting to length of the sealing strip on site would be very complex and/or expensive.

On the other hand, the clamping profile also has to have a specific tensile strength since the trim strips or sealing strips are usually manufactured by extrusion, with considerable forces occurring in the longitudinal direction of the band. A further requirement of the clamping profile comprises exerting a clamping force which is as large as possible onto the sealing flanges.

To meet these requirements, known metal bands of said kind consist of steel and have a material thickness of 0.5 mm and more. Steels of the category C390 and C590 are in particular used. In addition, bands composed of aluminum-magnesium alloys are used.

It is the underlying object of the invention to provide a metal band of the initially named kind that satisfies the requirements mentioned, but has the lowest possible weight in this respect. In addition, the material use for the metal bands or the trim strips or sealing strips produced thereby should be reduced.

This object is satisfied by a metal band of the initially mentioned kind that is characterized in that the metal band consists of microalloyed steel or multiphase steel.

Microalloyed steel, also known as HSLA steel, is steel to which very small quantities of vanadium and/or niobium and/or titanium have been added as alloys. The proportion of the elements added as alloys in total in particular lies between 0.03 and 0.3%.

Multiphase steel is to be understood as steel that has a basic structure of ferrite and bainite, in which portions of residual austenite are embedded, and that is additionally strengthened by very fine deposits. On the reshaping, the austenite portions are transformed into hard martensite, whereby the steel obtains a very high strength, in particular a tensile strength of up to 800 MPa, and a very good ductility, namely an elongation at break of up to 40% in the initial state.

By using microalloyed steel or multiphase steel, a high tensile strength can already be achieved with a smaller material thickness. It is therefore possible to produce metal bands for the above-mentioned purposes of use that have a material thickness of 0.4 mm or less. Weight is thereby saved. In addition, the amount of sealing material by which the belt has to be enveloped is thereby reduced.

The metal band preferably consists of hot-formed steel or cold-formed steel. Particularly good properties, in particular high tensile strengths with a simultaneously high stretchability, of the microalloyed steel or of the multiphase steel can hereby be achieved.

In accordance with a preferred embodiment, the metal band has a material thickness of 0.4 mm or less, preferably 0.35 mm or less, in particular 0.3 mm or less. The weight reduction and also the reduction of the required sealing material can hereby be optimized.

The metal band in accordance with the invention can be coated. The manufacture of the metal band can take place by a rotary cutting or punching and roller stretching.

The invention also relates to a sealing strip or an edge protection strip, in particular for closable vehicle openings such as windows, doors and flaps, comprising a metal band in accordance with the invention. The metal band serves as an inlay of the sealing strip or edge protection strip and can be enveloped by sealing material. The sealing strip or edge protection strip has the advantages described.

The metal band in the sealing strip or edge protection strip is preferably bent into a U-shaped clamping profile. The metal band can hereby be fastened in a simple manner in a vehicle opening or at an edge.

Figure 2:
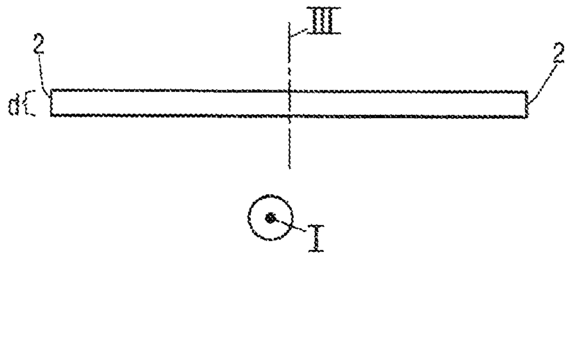
Figure 3:
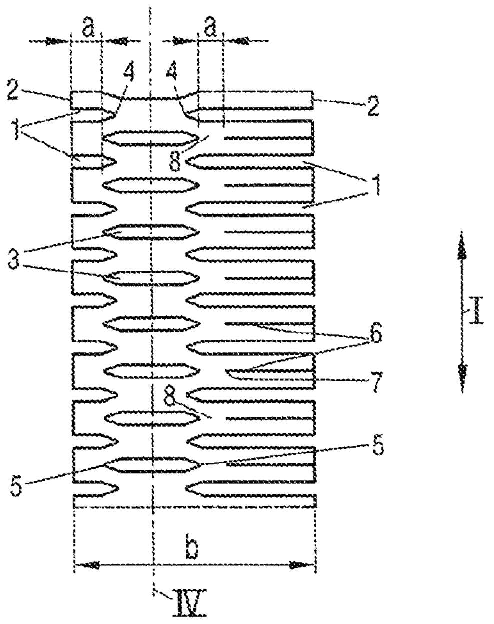
Figure 4:
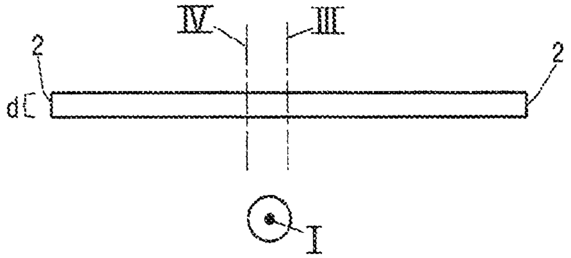
Figure 5:
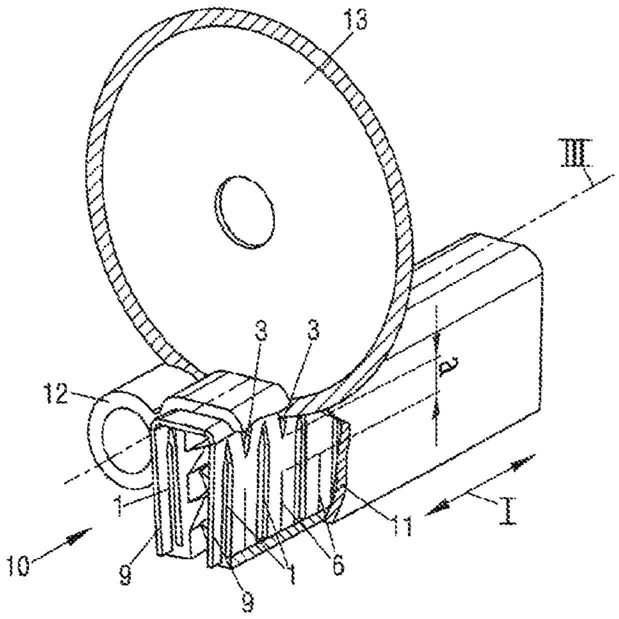

Embodiments of the invention are shown in the drawing and will be described in the following. There are shown, in a schematic representation in each case:

FIG. 1 a plan view of a first embodiment of the metal band in accordance with the invention;

FIG. 2 a front view of the metal band of FIG. 1 in an enlarged representation, viewed in the longitudinal direction of the metal band;

FIG. 3 a plan view of a second embodiment of a metal band in accordance with the invention;

FIG. 4 a front view of the metal band of FIG. 3 in an enlarged representation, viewed in the longitudinal direction of the metal band; and FIG. 5 a perspective view of a third embodiment of the metal band in accordance with the invention in a sealing strip during the cutting to length of the sealing strip.

The metal band, which is shown in FIG. 1 and which can be used as an inlay for trim strips or sealing strips of a flexible material, in particular of rubber or plastic, or as an edge protection, has a plurality of marginal slots 1 that periodically follow one another in the longitudinal direction I of the band and that are inwardly guided disposed opposite one another in pairs from the two margins 2 of the metal band. The marginal slots 1 have a length $I_1$ that corresponds to approximately three eighths of the width b of the metal band. The metal band furthermore has a respective central slot 3 between two respective consecutive pairs of marginal slots 1, the length $I_2$ of said central slot 3 amounting to approximately half of the band width b. The central slots 3 thereby slightly overlap, namely by approximately a twelfth of the width b, with the marginal slots 1 in the transverse direction II of the metal band.

The marginal slots 1 and the central slots 3 are produced by cutting and roller stretching and are thereby widened in the longitudinal direction I of the metal band. The marginal slots 1 have a shape which runs out into a wedge tip 4 at the inner band side, whereas the central slots 3 each run out into a wedge tip 5 toward the two margins of the metal band.

In addition to the marginal slots 1 and the central slots 3, the metal band is provided with cut-through portions 6 that extend transversely to the longitudinal direction I of the metal band and that are likewise produced by cutting, but are not widened, and that each extend from a margin 2 of the metal band in the direction of the wedge tip 5 of a central slot 3 disposed opposite the margin 2. A respective only short non-cut through region 8 is located between the end 7 of the cut-through portions 6 that is at the inner band side and the respective oppositely disposed wedge tip 5 of the central slots 3. This region in particular has an extent a in the transverse direction II of the metal band of less than 0.5 cm, in the embodiment shown of approximately 0.4 cm.

In the embodiment of FIG. 1, the central slots 3 are arranged symmetrically to the central longitudinal axis III of the metal band. As shown in FIG. 1, their length 12 is selected to be so large that the central slots 3 extend up to and into the limbs 9 of the U profile 10 formed from the metal band. The extent of the central slots 3 into the limbs 9 of the U profile 10 is, however, only short in relation to their length 12.

As shown in FIG. 2, the metal band has a comparatively small material thickness d. The material thickness can amount to 0.4 mm or less. In addition to the material savings, a low weight thereby also results. In addition, less sealing material is needed to envelop the metal band.

In the embodiment shown in FIG. 3, the central slots 3 are not arranged symmetrically to the central longitudinal axis Ill of the metal band, but to a longitudinal axis IV in parallel therewith. The marginal slots 1 also have such a length $I_1$ in this embodiment that the marginal slots only slightly overlap with the central slots 3 in the transverse direction II of the metal band. Accordingly, the marginal slots 1 extending from the margin at the left in FIG. 3 to the interior of the band have a smaller length than the marginal slots 1 extending from the margin at the right in FIG. 3 to the interior of the band. The size of the overlap corresponds to that of the embodiment of FIG. 1.

Furthermore, in this embodiment, cut-through portions 6 are only provided at the side of the long marginal slots 1 of the metal band, that is only starting from the right margin in FIG. 2. The non-cut through region 8 between the ends 7 at the inner band side and the respective oppositely disposed wedge tip 5 of the central slots 3 also has an only short length a of preferably less than 0.5 cm here, in particular in accordance with the embodiment of approximately 0.4 cm. Due to the asymmetrical arrangement of the central slots 3, the spacing of the other wedge tips 5 of the central slots 3 from the left margin 2 of the metal band likewise only have a small size, in particular in the embodiment shown of approximately 0.5 cm. The advantages described therefore also result on the cutting to length of this metal band without cut-through portions at the left side of the metal band. It is, however, also possible with an asymmetrical arrangement of the central slots 3 to provide cut-through portions 6 at both sides of the metal band, that is starting from both margins 2.

FIG. 4 again shows the comparatively small material thickness d of the metal band of FIG. 3.

In both the first embodiment and the second embodiment, the metal band consists of a cold-formed or hot-formed microalloyed steel. A high strength hereby results. Thus, the tensile strength $R_m$ can amount to more than 750 MPa. Advantageous properties of a trim strip or sealing strip or edge protection strip can thus be achieved.

FIG. 5 shows the cutting through of a clamping profile equipped with a metal band in accordance with the invention. The metal band is bent into a U profile 10 and is jacketed by a sealing material 11. The clamping profile additionally has a sealing lip 12.

A separating disk 13, whose drive is not shown, is used to cut through the clamping profile in the example shown. The separating disk can automatically be positioned at one of the central slots 3. A cutting through of the clamping profile can thereby take place at a position at which only short, non-cut through regions, namely the regions 8 between the wedge tips 5 of the central slot 3 and the two oppositely disposed cut-through portions 6, are present. These regions 8 have an only short length a of approximately 0.4 cm. As a result, and due to the small material thickness of the belt, only a small energy input is required for cutting through the clamping profile, whereby a slight impairment of the clamping profile results. In addition, smooth cut surfaces can be obtained in the region of a central slot 3 on the cutting through of the clamping profile. Furthermore, relatively few contaminants are produced by chip formation in the separation process. The susceptibility to corrosion is thus also reduced.

REFERENCE NUMERAL LIST

1 marginal slot
2 margin
3 central slot
4 tip of 1
5 tip of 3
6 cut-through portion
28 end of 6
8 non-cut through region
9 limbs of 10
10 U profile
11 jacket
12 sealing lip
13 separating disk
a length of 8
b width of the metal band
d material thickness of the metal band
$I_1$ length of 1
$I_2$ length of 3
I longitudinal direction of the metal band
II transverse direction of the metal band
III central longitudinal axis of the metal band
IV parallel axis to III

The invention claimed is:

1. A metal band for use as an inlay in a trim strip or sealing strip, or as edge protection, said metal band comprising a plurality of cut and/or punched apertures,
wherein the metal band is formed of a high-strength low-alloy (HSLA) microalloyed steel, and
wherein the metal band has a material thickness of 0.4 mm or less.

2. The metal band in accordance with claim 1,
wherein the metal band is configured for use in a motor vehicle and or a switch cabinet.

3. The metal band in accordance with claim 1, wherein the metal band has a material thickness of 0.35 mm or less.

4. The metal band in accordance with claim 1, wherein the metal band has a material thickness of 0.3 mm or less.

5. The metal band in accordance with claim 1, wherein the metal band is coated.

6. The metal band in accordance with claim 1,
wherein the metal band is produced by rotary cutting or punching, and roller stretching.

7. A sealing strip, a trim strip, or an edge protection strip, said strip comprising:

a metal band, said metal band being provided with cut and/or punched apertures, wherein the metal band is formed of a high-strength low-alloy (HSLA) microalloyed steel, and wherein the metal band has a material thickness of 0.4 mm or less.

8. The sealing strip, the trim strip, or the edge protection strip in accordance with claim 7, wherein said strip is configured for closable vehicle openings.

9. The sealing strip, the trim strip, or the edge protection strip in accordance with claim 7, wherein said strip is provided with an envelope composed of sealing material.

10. The sealing strip, the trim strip, or the edge protection strip in accordance with claim 7, wherein the metal band is bent into a U-shaped clamping profile.

11. A metal band for use as an inlay in a trim strip or sealing strip, or as edge protection, the metal band comprising:

a plurality of cut and/or punched apertures, wherein the metal band is formed of a microalloyed steel having a tensile strength of 800 MPa or less, and wherein the metal band has a material thickness of 0.4 mm or less.

12. The metal band of claim 11, wherein the metal band has a tensile strength of at least 750 MPa but not more than 800 MPa.

13. The metal band of claim 11, where the metal band is compressible and stretchable in at least a longitudinal direction.

14. The metal band of claim 11, wherein the metal band is produced by rotary cutting or punching, and roller stretching.

15. The metal band of claim 11, wherein the metal band is formed of a high-strength low-alloy (HSLA) microalloyed steel.

16. The metal band of claim 1, further comprising a jacket of plastic or rubber at least partially enclosing the metal band.

17. The metal band of claim 1, wherein the metal band is compressible and stretchable in a longitudinal direction.

18. The metal band of claim 1, wherein the metal band is bent into a U-shaped clamping profile.

19. The metal band of claim 7, further comprising a jacket of plastic or rubber at least partially enclosing the metal band.

20. The metal band of claim 7, wherein the metal band is compressible and stretchable in a longitudinal direction.

* * * * *